Oct. 19, 1965  W. A. MARTIN  3,212,838
FILM CASSETTE
Filed June 8, 1962  3 Sheets-Sheet 1

WILLIAM A. MARTIN
INVENTOR.

BY R. Frank Smith
Robert W. Hampton

ATTORNEYS

Oct. 19, 1965 W. A. MARTIN 3,212,838
FILM CASSETTE
Filed June 8, 1962 3 Sheets-Sheet 2
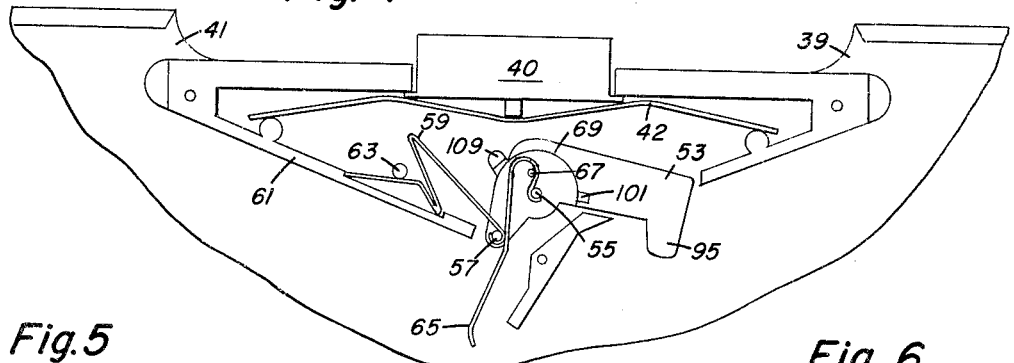
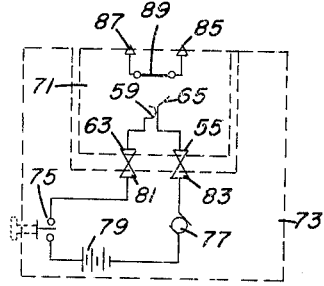
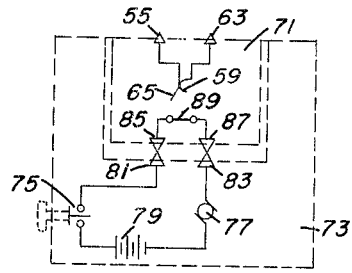
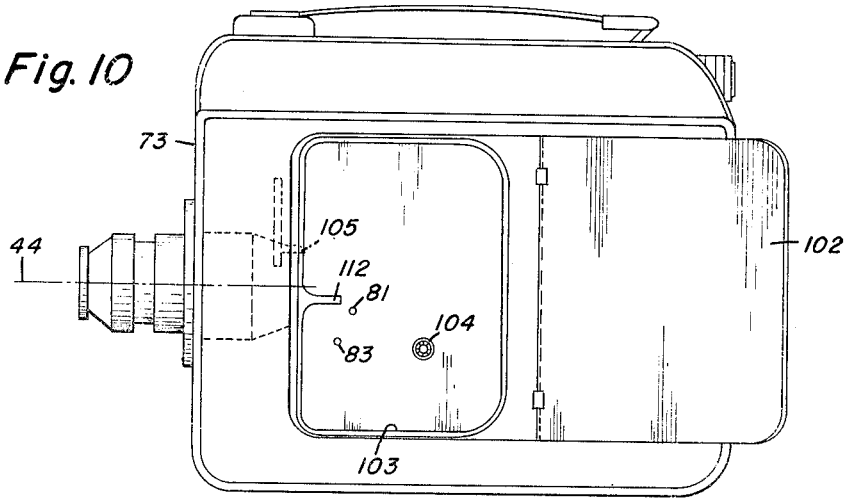
WILLIAM A. MARTIN
INVENTOR.
BY R. Frank Smith
Robert W. Hampton
ATTORNEYS Oct. 19, 1965  W. A. MARTIN  3,212,838
FILM CASSETTE Filed June 8, 1962  3 Sheets-Sheet 3

WILLIAM A. MARTIN
INVENTOR.

BY R. Frank Smith
Robert W. Hampton

ATTORNEYS

United States Patent Office 3,212,838
Patented Oct. 19, 1965

3,212,838
FILM CASSETTE
William A. Martin, Rochester, N.Y., assignor to Eastman Kodak Company, Rochester, N.Y., a corporation of New Jersey
Filed June 8, 1962, Ser. No. 201,034
15 Claims. (Cl. 352—78)

This invention relates to film-holding cassettes for movie cameras and, more particularly to an improved cassette designed for insertion into an electrically driven movie camera and including a novel arrangement for preventing run-off of the film trailer from the cassette's film supply spool.

The cassette-loading movie camera has been developed as an improvement over both reel-loading and magazine-loading cameras. With reel-loading cameras the operator must insert a spool of unexposed film and thread the latter through the camera's film drive mechanism as well as onto a take-up spool. With 8 mm. cameras, after exposure of one side of the film the operator must open the camera and reverse the positions of the take-up spool and the supply spool, rethreading the film from the take-up spool, through the camera's film drive mechanism, and back onto the supply spool. Magazine-loading cameras are simpler to handle in that the operator need only insert the magazine into the camera in a first position and, after one side of the film has been exposed, remove the magazine, turn it over, and reinsert it to expose the other side of the film. However, magazines cannot be loaded and unloaded by the operator, and the entire magazine unit must be sent to the processor when it is desired to have the film processed.

The purpose of the cassette is to provide a unit which can be simply loaded by the operator with a supply spool of unexposed film and which, once loaded and closed, can be easily inserted into the camera and handled in the same manner that the operator would handle a magazine. In addition to its magazine-like ease of operation and handling, the cassette has a major advantage over a magazine in that relatively inexpensive roll film can be used, and there is no necessity for sending back the entire cassette unit to the film processor when it is desired to have the film processed.

In order to provide these combined advantages of economy and simplicity of handling, it is essential that the operator be able to rewind the film in the cassette upon its supply spool following its exposure (16 mm.) or to place the film in the camera in reverse so that the other side of the film can be exposed as it is being rewound onto the supply spool (8 mm.). However, if, when the film is initially being exposed, it is permitted to completely unwind off the supply spool, it then becomes necessary to utilize darkroom facilities in order to rethread the film trailer back onto the suply spool so that it can be further exposed and/or rewound. The necessity for such recourse to the darkroom is highly undesirable, and the purpose of the invention herein is to overcome this run-off problem.

According to the invention herein, such undesirable run-off of the trailer from the supply spool is prevented by means of a special switch through which the electric drive circuit of the camera must be completed to permit operation of the electric drive motor. The switch is designed to sense the amount of film that has been received and stored in the take-up portion of the cassette and to open the camera's electric motor circuit in time to prevent run-off while still permitting the camera operator to expose the maximum amount of usable film footage. Since all film manufacturers do not provide a standard amount of film (actual footage of film in a "25-foot" spool varies as much as 3 feet), and since all movie films do not have identical thicknesses, the switch mechanism disclosed herein automatically adjusts and compensates for such differences to assure the desired run-off protection and maximum amount of usable footage for any particular type of film that may be inserted in the cassette.

In general, the particular embodiment of the switch disclosed herein includes a spring-biased lever having one end that protrudes into the film supply section of the the cassette to sense the initial diameter of the roll of film stored upon the supply spool. At the other end of this lever is a cut-off spring which extends into the take-up portion of the cassette. This cut-off spring comprises one contact of the switch mechanism, and when the amount of film received by and stored in the take-up section of the cassette reaches a predetermined amount, the cut-off spring senses the surface of the film which causes it to move out of electrical contact with its co-acting switch member, thereby opening the circuit to the camera's drive motor. The proper sensing position of the cut-off spring is determined by the initial diameter of the roll of film stored on the supply spool and sensed by the lever when the supply spool is initially placed in the cassette. Once the cut-off switch has opened, preventing further operation of the electric film drive, the operator merely opens the camera, takes out the cassette, turns it over and reinserts it in the camera. The film can then be further exposed and/or rewound by the operator, since the electric motor circuit can be again selectively closed whenever the cassette is placed in the camera in its reversed position. Further, means are provided to disengage the entire switch mechanism and its sensing members from any further contact with the surface of the film after the cassette has been reversed and reinserted in the camera for further exposure and/or rewinding purposes.

Therefore, it is an object of this invention to provide a new and improved film cassette for electric drive movie cameras.

It is another object of this invention to provide a simple-loading film cassette with switch means for preventing the run-off of the trailer from the supply spool.

It is a further object to provide a cassette having switching means for stopping the film drive of an electric camera, the switching means being adjustable automatically for films of varying thicknesses and length to assure satisfactory run-off protection while maintaining maximum exposure of usable footage.

And yet another object is to provide a switch mechanism for an electric movie camera film cassette which can be used initially to automatically stop the camera's film drive before the film trailer has run off the supply spool, and which can be automatically and completely disengaged from any contact with the film when the film is being rewound on the supply spool.

Other objects, purposes and characteristic features of the present invention will be in part obvious from the accompanying drawings, and in part pointed out as the description of the invention progresses. In describing the invention in detail, reference will be made to the accompanying drawings in which like reference characters designate corresponding parts throughout the several views, and in which:

FIG. 4 is an enlarged elevational view of one portion of the cassette showing the novel switch mechanism utilized in the particular embodiment of the invention disclosed herein;

FIGS. 5 and 6 are schematic representations of the electrical circuits involved in both the camera and the film cassette, FIG. 5 showing the cassette in its position when initially placed in the camera, and FIG. 6 illustrating the cassette when it is in its reversed position permitting the film to be rewound on the supply spool;

Figure 7:
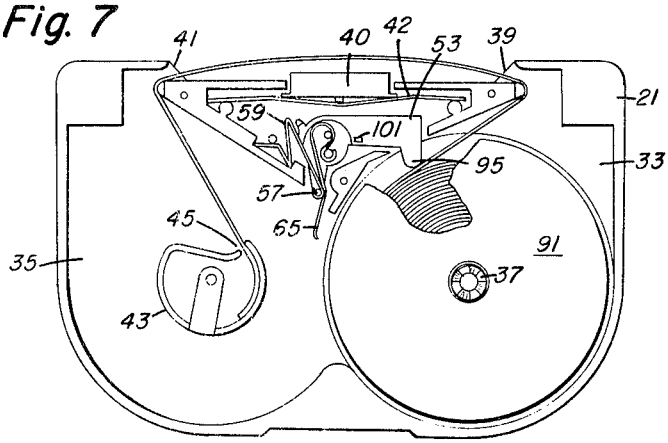
Figure 8:
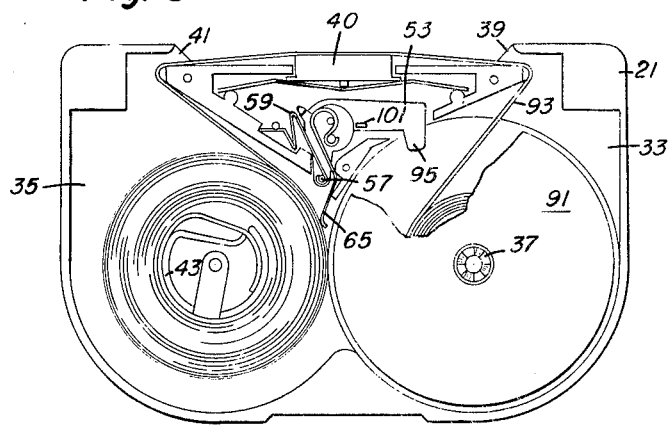
Figure 9:
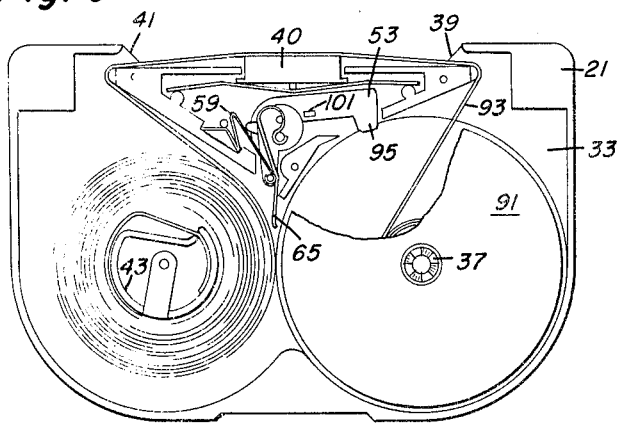

FIGS. 7, 8 and 9 are elevational views of the interior of the cassette, illustrating the various relative positions of the switch mechanism during actual operation, FIG. 7 illustrating the position at the time when the supply spool has just been placed in the cassette in preparation for initial exposure of the film, FIG. 8 illustrating the position of the switch members at the time the switch has opened the circuit to the electric drive motor of the camera in order to prevent run-off of the film trailer from the supply spool, and FIG. 9 illustrating the position of the switch members after the cassette has been reversed and placed back into the camera preparatory to rewinding the film on the supply spool (note: to facilitate comparison with FIGS. 7 and 8, FIG. 9 is not reversed);

FIG. 10 is an elevational view of a camera designed to receive the cassette disclosed herein, illustrating the camera with its cassette-receiving recess open and omitting parts not pertinent to the disclosure herein.

Figure 1:
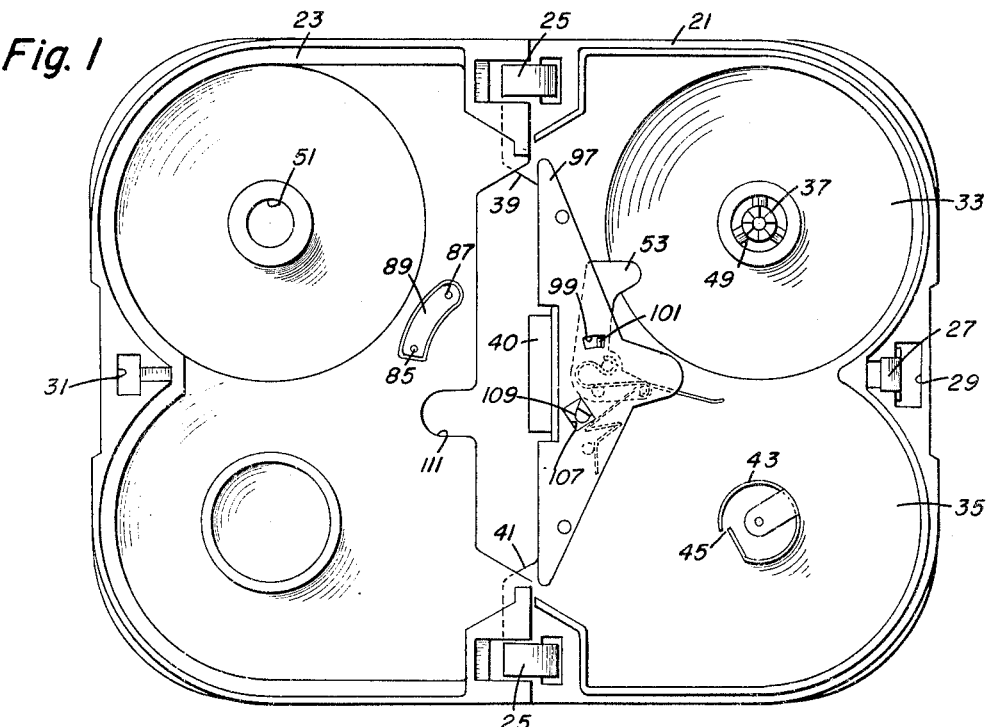
FIG. 1 is an elevational view of an open cassette showing the inside of the body and the cover of the cassette casing.
Figure 2:
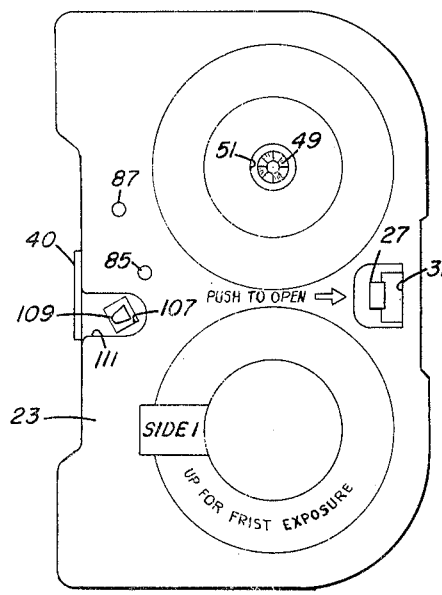
FIGS. 2 and 3 are, respectively, elevational views of the closed cassette viewed from the cover side (FIG. 2) and from the body side (FIG. 3)
Figure 3:
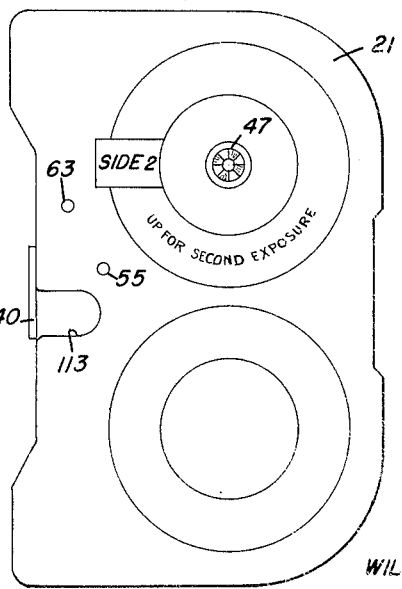

Referring now principally to FIGS. 1, 2 and 3, the casing of the cassette is made up of a body member 21 and a cover member 23. Cover member 23 is suitably attached to body member 21 by means of hinges 25. When the cover 23 is in closed relation to the body 21, it is held securely by spring latch 27 which is suitably mounted in recess 29 of body member 21 and acts in cooperation with opening 31 in cover 23 to maintain the casing members in closed relation.

The major portion of casing body 21 is divided into two recessed sections, film supply recess 33 and film take-up recess 35, and film supply spindle 37 is rotatably mounted in the center of recess 33 to receive the film supply spool. Slot openings 39 and 41, which border the center section of the front wall of casing body 21, in conjunction with a film pressure pad 40 biased by a spring 42 (see FIG. 4), act as film guides for positioning the film in proper relation to the camera's picture-taking axis 44 and the film driving claw 105 (FIG. 10) when the cassette is loaded and inserted in a camera.

Take-up spindle 43, which has a film-trapping slot 45, is rotatably mounted in the center of film take-up recess 35. Take-up spindle 43 has a saw-tooth clutch face 47 at one end which is accessible to and driven by the camera's spindle drive 104 (FIG. 10) through a suitable aperture in the bottom of casing body 21 (see FIG. 3). Similarly, supply spindle 37 also has a saw-tooth clutch face 49 at one end which is accessible through opening 51 in casing cover 23. It is by means of clutch face 49 that supply spindle 37 is driven by spindle drive 104 when the position of the cassette in the camera is reversed for purposes of rewinding the film on the supply spindle.

Referring now to the enlarged detail of the switch mechanism illustrated in FIG. 4, lever arm 53 is rotatably mounted on pivot 55 which is made of brass or other electrically conductive material and extends through the bottom of casing body 21 (see FIG. 3). Located at one end of lever arm 53 is a stud 57 and attached to it is one end of a compression spring 59 which biases lever arm 53 in a clockwise direction. Compression spring 59 is anchored against interior wall 61 of casing body 21, and at all times contacts post 63 which is made of brass or other suitable electrically conductive material and which also extends through the bottom of casing body 21 (see FIG. 3). Cut-off spring 65 is attached to lever arm 53 and is tensionally secured in a recessed portion of lever arm 53, being entwined between post 55, a stud 67, and the wall 69 formed by the recessed portion of lever arm 53. The spring bias of cut-off spring 65 causes it to normally contact that portion of compression spring 59 which is wrapped around stud 57.

So long as cut-off spring 65 contacts compression spring 59, a circuit is closed from post 63, through compression 59 and cut-off spring 65, to pivot 55. This circuit is shown in FIGS. 5 and 6 which are simplified schematic diagrams of the general electrical circuitry of a camera and a cassette utilizing the switching mechanisms disclosed herein. The cassette, represented generally by block 71, may be inserted into the camera (represented generally by block 73) in a first position, which is illustrated at FIG. 5, and also in a second position as illustrated in FIG. 6. The camera contains the usual on-off switch 75 which permits the operator to selectively energize electric drive motor 77 from the power source shown as battery 79. However, this circuit is open at contacts 81 and 83 unless the cassette is in the camera. The cassette 71 is initially inserted into camera 73 in its first position illustrated in FIG. 5, and when in this position it can be seen that the circuit just described above (including post 63, compression spring 59, cut-off spring 65 and pivot 55 of the automatic switch assembly) normally provides the necessary path for completing the energizing circuit for drive motor 77.

After the camera operator has exposed the predetermined maximum amount of film, but before the trailer has completely unwound from the supply spool, the film stored in the take-up recess of the cassette causes cut-off spring 65 to be moved out of contact with compression spring 59, thereby opening the electric drive motor circuit and making it impossible for the operator to cause the last few feet of film trailer to be unwounded from the supply spool. At this time the operator opens the camera, removes the cassette, and then re-inserts it in its second or reverse position as shown in FIG. 6 In this position contact points 81 and 83 are contacted respectively by conductive rivets 85 and 87 (also shown in FIG. 3) which are electrically connected by shorting-bar pressure pad 89 (also shown in FIG. 1). This once again provides the necessary means to complete the energization circuit for motor 77, and, with the cassette in this position, the operator can selectively energize drive motor 77 by means of switch 75 to cause the film to be further exposed and/or be completely rewound onto the supply spool.

It is believed that the nature of the invention can be best understood with further description being set forth from the standpoint of operation, with particular reference being made to FIGS. 7, 8 and 9. To initially load film into a camera utilizing a cassette of the type disclosed herein, the operator opens the cassette, placing a supply spool 91 of unexposed film 93 over rotatable supply spindle 37 and into film supply recess 33 of the cassette casing body 21. The leader of the film 93 is then threaded simply through slot opening 39, across film pressure pad 40, and through slot opening 41, and the end of the leader is placed in film-trapping slot 45 of rotatable take-up spindle 43.

As can be seen from FIG. 7, this initial threading operation positions lever arm 53 so that its sensing toe 95 is contacting the non-emulsion side of the outer layer of the roll of film stored on supply spool 91. Contact between sensing toe 95 of lever 53 and the surface of the roll of film has been assured by the clockwise rotational bias which is applied to lever arm 53 by compression spring 59. It is this initial position of lever arm 53 that determines the correct sensing position of cut-off spring 65.

Cut-off spring 65 is fixed to lever arm 53 in a predetermined relation, namely, so that for any given position of lever arm 53, the shortest distance between sensing toe 95 and the hub of supply spool 91 is always slightly greater than the shortest distance between cut-off spring 65 and take-up spindle 43. Thus, so long as lever arm 53 remains in its initial position in relation to the film reel stored on supply spool 91, cut-off spring 65 will contact the roll of film stored in take-up recess 35 before the film trailer has completely unwound from the hub of supply spool 91. The exact relation between cut-off spring 65 and lever arm 53 is designed to assure the maximum exposure of film 93 practicable without permitting the trailer of film 93 to completely unwind off supply spool 91.

However, since lever arm 53 would tend to move in a clockwise direction as the film 93 begins to unwind from the supply spool 91 to the take-up spindle 43, and since cut-off spring 65 moves with lever arm 53, it is essential that means be provided to maintain lever arm 53 in its initial position in which it has sensed the size of the roll of film stored on supply spool 91. Lever arm 53 is secured in its initial position in the following manner: Referring once again to FIG. 1, switch mechanism cover 97 is provided with an arcuate opening 99 through which projects extension 101 of lever arm 53. The relative position of extension 101 in opening 99 is determined by the position of lever arm 53. When the film has been placed in the cassette initially and lever arm 53 is positioned by its sensing of the diameter of the roll of film stored on supply spool 91, the cover 23 of the cassette is closed, and this causes pressure pad 89 (which also serves as a shorting bar as discussed above) to press down upon the upper surface of extension 101. The friction between the surface of pressure pad 89 and the top of extension 101 is sufficient to overcome the force of compression spring 59 and to maintain lever arm 53 in its position as initially set.

The operator next opens hinged cover 102 of camera 73 (as illustrated in FIG. 10) and places the cassette in the cassette-receiving recess 103 so that the extending portions of pivot 55 and post 63 (see also FIG. 5) make electrical contact with contact points 81 and 83 within the camera body. As explained above, since cut-off spring 65 is in electrical contact with compression spring 59 at the point where both pass stud 57, the drive motor 77 of the camera can now be selectively operated by switch 75. When the cassette is placed in recess 103 in this position, saw-toothed clutch face 47 of take-up spindle 43 (also see FIG. 3) is engaged by the similarly sawtoothed face of the spindle drive 104, and film-driving claw 105 can engage the perforations of film 93, spindle drive 104 and film-driving claw 105 being, respectively, suitably geared and cammed to motor 77. As the film is driven from the supply spool 91 and wound onto take-up spindle 43, it is maintained in proper relation to the camera aperture by means of film pressure pad 40 which is biased by spring 42.

Referring now to FIG. 8, when all of film 93 has been exposed except approximately three to five feet of trailer remaining on supply spool 91, the diameter of the roll of film which has formed around take-up spindle 43 in takeup recess 35 of the cassette is such that the non-emulsion side of the outer layer of the film reel contacts the sensing end of cut-off spring 65. This causes cut-off spring 65 to be moved out of electrical contact with compression spring 59 and opens the circuit connecting battery 79 and drive motor 77, and the motor can no longer be operated in response to the closing of on-off switch 75. In this manner, the disclosed switch mechanism automatically prevents the trailer of film 93 from unwinding completely off supply spool 91, and the film can now be rewound on supply spool 91 without necessitating the opening of the cassette in a darkroom.

At this time, the operator removes the cassette from the camera, turns it over, and reinserts it in the camera so that conductive rivets 85 and 87 now make electrical connection with contact points 81 and 83 in the camera body (see FIG. 6). The electrical circuit for drive motor 77 is now completed through contact 81, rivet 85, shorting bar 89, rivet 87 and contact 83. Drive motor 77 can once again be selectively energized by the closing of on-off switch 75 by the operator. In this reversed position, the exposed saw-toothed clutch face 49 of supply spindle 37 is engaged by spindle drive 104, and the film can now be rewound onto supply spool 91. It should be noted that in an 8 mm. movie camera this rewinding procedure would also include the exposure of the second side of film 93.

Since it has been found that a camera generally does not rewind the film on the supply spool as tightly as the film was intially wound thereon by the film manufacturer, it is preferable to completely disengage the switch mechanism from any contact with the film during the rewind. This disengagement has been provided for as follows: Referring once again to FIGS. 1, 2 and 3, the switch mechanism cover 97 has been provided with a second opening 107 through which protrudes knob 109 which is a vertical extension of lever arm 53. A recess 111 in cover 23 leaves knob 109 exposed when the cassette is closed (see FIG. 2). When the cassette is inserted in the camera in its second, or rewind position, knob 109 is contacted by a fixed stud 112 in the camera body (see FIG. 10) which causes lever arm 53 to be driven in a counter-clockwise direction to the position illustrated in FIG. 9. Lever arm 53 is maintained in this position until the cassette is removed from the camera. It should be noted that when the cassette is initially placed into the camera in its first position, necessary clearance for stud 112 is provided by a recess 113 in the cassette body 21 (FIG. 3).

Once the cassette is reinserted in the camera in its rewind position, the operator can selectively energize drive motor 77, and film 93 can be completely rewound onto supply spool 91. Following rewinding of film 93, or its rewinding and further exposure, the cassette may be removed from the camera, opened in normal light conditions, and the supply spool of exposed film can be simply removed for processing.

Having described one specific embodiment of the present invention, it is desired that it be understood that this form is selected to facilitate in the disclosure of the invention rather than to limit the number of forms which it may assume; and, it is to be further understood that various modifications, adaptations, and alterations may be applied to the specific form shown to meet the requirements of practice, without in any manner departing from the spirit or scope of the present invention.

What I claim is:

1. In a film cassette for insertion into a motion-picture camera, said camera having motor means for driving film past in exposure aperture and including a spindle driving member, and electrical control means for selectively operating said motor means, and said cassette having a film supply spindle for receiving a spool of film and a film take-up spindle to engage said spindle driving member when said cassette is inserted into said camera for taking up said film driven from said supply spindle past said exposure aperture by said motor means, the improvement comprising: switch means in said cassette connected to said electrical control means when said cassette is inserted into said camera and movable to a motor disabling position in response to a predetermined amount of said film taken up on said take-up spindle for rendering said motor means inoperative when said predetermined amount of said film is taken up on said take-up spindle, and film sensing means responsive to the amount of film stored on said spool when said spool is initially received by said film supply spindle for determining the amount of film necessary to move said switch means to said motor disabling position.

2. A cassette according to claim 1 wherein said supply spindle is adapted to engage said spindle driving member, and said camera is designed to alternatively receive said cassette in a first position in which said take-up spindle engages said spindle driving member and said supply spindle is free to rotate and in a second position in which said supply spindle engages said spindle driving member and said take-up spindle is free to rotate and wherein said switch means is connected with said electrical control means only when said cassette is in its said first position, whereby when said cassette is in its said second position said film is rewound and stored on said spool by rotation of said supply spindle in response to the selective operation of said motor means.

3. In a film cassette for insertion into a motion-picture camera in alternatively a first and a second position,
(A) said motion-picture camera comprising:
(1) a source of electrical power,
(2) electrical motor means for driving film past an exposure aperture and including a spindle driving member, and
(3) a motor circuit connecting said motor means and said power source and including first switch means for selectively opening and closing the same;
(B) said cassette comprising:
(1) a film supply spindle for receiving a spool of film and engaging said spindle driving member when said cassette is inserted into said camera in said second position, and
(2) a film take-up spindle to engage said spindle driving member when said cassette is inserted into said camera in said first position for taking up said film as it is fed from said spool and past said exposure aperture by said motor means,
the improvement comprising:
(C) secondary switch means connected into said motor circuit in series with said first switch means when said cassette is inserted into said camera in said first position, said secondary switch means being:
(1) normally closed, and
(2) movable in response to a predetermined amount of film taken up on said take-up spindle for opening said motor circuit when a predetermined amount of film has been taken up on said take-up spindle, and
(D) film sensing means responsive to the amount of film on said spool when said spool is initially received by said film supply spindle for determining the time of opening of said secondary switch means,
(E) said film being rewound and stored on said spool in response to the selective operation of said first switch means when said cassette is inserted into said camera in said second position.

4. A film cassette according to claim 3 wherein said secondary switch means includes
(A) a pair of switch contacts movable between a normally closed position to close said motor circuit and an open position to open said circuit,
(B) said switch contacts being disposed in relation to the film wound on said take-up spindle to cause said switch contacts to be moved by said film to said open position to open said motor circuit when a predetermined amount of film has been taken up on said take-up spindle.

5. A film cassette according to claim 3 wherein said film sensing means includes:
(A) a spring, and
(B) a lever arm disposed in relation to said film supply spindle and biased by said spring to contact the film stored on said spool when said spool is initially received by said film supply spindle.

6. In a film cassette for insertion into a motion-picture camera,
(A) said motion-picture camera having:
(1) a source of electrical power,
(2) electrical motor means for driving film past an exposure aperture and including a spindle driving member, and
(3) a motor circuit connecting said motor means and said power source and including first switch means for selectively opening and closing the same;
(B) said cassette comprising:
(1) a casing formed by two hinged members disposed in closable relation,
(2) a film supply spindle for receiving a spool of film, and
(3) a film take-up spindle engaged by said spindle driving member when said cassette is inserted into said camera for taking up said film as it is fed from said supply spool and past said exposure aperture by said motor means,
the improvement comprising:
(C) a spring,
(D) a lever arm disposed in relation to said film supply spindle and biased by said spring into contact with the periphery of the roll of film on said supply spool,
(E) lever arm securing means disposed in frictional relation with said lever arm whenever said hinged casing members are in closed relation for holding said lever arm in its initial angular relation to said film stored on said spool when said spool is initially received by said film supply spindle, and
(F) secondary switch means connected into said motor circuit in series with said first switch means when said cassette is inserted into said camera and responsive to the position of said lever arm, said secondary switch means being
(1) movable between a first and a second position,
(2) normally biased to said first position to close said motor circuit, and
(3) disposed in relation to said take-up spindle to cause said secondary switch means to be moved to its second position to open said motor circuit whenever a predetermined amount of said film has been taken up on said take-up spindle.

7. A film cassette according to claim 6 wherein said secondary switch means includes a spring contact secured to said lever arm and having a portion thereof disposed to contact the surface of the film taken up on said take-up spindle whenever said take-up spindle has received and stored a predetermined amount of said film, said predetermined amount varying in accordance with the position of said lever arm as held by said lever arm securing means.

8. A film cassette according to claim 7 wherein:
(A) said cassette may be inserted in said camera alternatively in a first and a second position,
(B) said film supply spindle engages said spindle driving member when said cassette is inserted in said camera in said second position,
(C) said secondary switch means is only operative when said cassette is in said first position, and including
(D) shorting-bar means operative only when said cassette is in said second position for completing said motor circuit to cause said film to be returned and stored on said spool by said supply spindle in response to the selective operation of said motor means.

9. A cassette according to claim 8 wherein said camera includes a lever arm blocking means responsive to the insertion of said cassette into said camera in said second position for causing said lever arm to be rotated away from the position in which it is being held by said lever arm securing means and to cause said lever arm and said spring contact of said secondary switch means to remain out of contact with the surface of the film as it is being rewound and stored on said spool.

10. In the combination of a motion-picture camera and a film cassette for insertion therein, said camera having drive means for driving film past an exposure aperture and including a spindle driving member, and drive control means for selectively operating said drive means and said cassette having a film supply spindle for receiving a spool of film and a film take-up spindle engaged by said spindle driving member when said cassette is inserted into said camera for taking up said film driven from said supply spindle past said exposure aperture by said drive means, the improvement comprising: a cut-off member in said cassette connected to said drive control means when said cassette is inserted into said camera and movable to a film drive disabling position in response to a predetermined amount of film taken up on said take-up spindle for rendering said drive means inoperative whenever said predetermined amount of said film is taken up on said take-up spindle and said cut-off member is moved to said drive disabling position, and film sensing means including an element positioned in accordance with the amount of film stored on said supply spool when said spool is initially received by said film supply spindle for determining said amount of film necessary to cause said cut-off member to move to said drive disabling position rendering said drive means inoperative.

11. A cassette according to claim 10 wherein said supply spindle is adapted to engage said spindle driving member, and said camera is designed to alternatively receive said cassette in a first position in which said take-up spindle is drivingly engaged by said spindle driving member and said supply spindle is free to rotate and in a second position in which said supply spindle is drivingly engaged by said spindle driving member and said take-up spindle is free to rotate and wherein said cut-off member is connected to said drive control means only when said cassette is in its first said position, and when said cassette is inserted into said camera in said second position said film is rewound and stored on said spool by rotation of said supply spindle in response to the selective operation of said drive means.

12. In a film cassette for insertion into a motion-picture camera,
    (A) said motion-picture camera having drive means selectively operated by a drive control means for driving film past an exposure aperture and including a spindle driving member, and
    (B) said cassette comprising:
        (1) a casing formed by two hinged members disposed in closable relation,
        (2) a film supply spindle for receiving a spool of film, and
        (3) a film take-up spindle engaged by said spindle driving member when said cassette is inserted into said camera for taking up said film as it is fed from said supply spool and past said exposure aperture by said drive means,
the improvement comprising:
    (C) a spring,
    (D) a lever arm disposed in relation to said film supply spindle and biased by said spring into contact with the periphery of the roll of film on said supply spool,
    (E) lever arm securing means disposed in frictional relation with said lever arm whenever said hinged casing members are in closed relation for holding said lever arm in its initial angular relation to said film stored on said spool when said spool is initially received by said film supply spindle, and
    (F) a cut-off member means connected to said drive control means when said cassette is inserted into said camera and responsive to the position of said lever arm, said cut-off member being
        (1) movable between a first and a second position,
        (2) normally biased to said first position, and
        (3) disposed in relation to said take-up spindle to be moved to said second position disabling said drive means whenever a predetermined amount of said film has been taken up on said take-up spindle.

13. A film cassette according to claim 12 wherein said cut-off member is secured to said lever arm and has a portion thereof disposed to contact the surface of the film taken up on said take-up spindle whenever said take-up spindle has received and stored a predetermined amount of said film, said predetermined amount varying in accordance with the position of said lever arm as held by said lever arm securing means.

14. A film cassette according to claim 13 wherein:
    (A) said cassette may be inserted in said camera alternatively in a first and a second position,
    (B) said film supply spindle drivingly engages said spindle driving member when said cassette is inserted into said camera in said second position,
    (C) said cut-off member is only operative when said cassette is in said first position, and
    (D) when said cassette is in said second position said film is returned and stored on said spool by said supply spindle in response to the selective operation of said drive means.

15. A cassette according to claim 14 wherein said camera includes a lever arm blocking means responsive to the insertion of said cassette into said camera in said second position for moving said lever arm from the position in which it is being held by said lever arm securing means, whereby said lever arm and said cut-off member remain out of contact with the surface of the film as it is being rewound and stored on said spool.

References Cited by the Examiner

UNITED STATES PATENTS

| | | | |
|---|---|---|---|
| 2,427,585 | 9/47 | Williams | 352—78 |
| 2,987,956 | 6/61 | Planert et al. | 352—78 |
| 3,008,661 | 11/61 | Estes et al. | 352—77 |
| 3,017,803 | 1/62 | Sakaki | 352—76 |

JULIA E. COINER, *Primary Examiner.*